United States Patent [19]

Ouvrier

[11] 3,870,955

[45] Mar. 11, 1975

[54] EMERGENCY SWITCHING EQUIPMENT FOR BROADBAND TRANSMISSION

[75] Inventor: Günther Ouvrier, Tumba, Sweden

[73] Assignee: Telefonaktiebolaget L M Ericsson, Stockholm, Sweden

[22] Filed: May 21, 1973

[21] Appl. No.: 361,986

[30] Foreign Application Priority Data

June 9, 1972 Sweden .............................. 7606/72

[52] U.S. Cl. ............................... 325/2, 340/147 SC

[51] Int. Cl. ............................................ H04j 3/14

[58] Field of Search ....... 179/15 AD, 15 AT, 170 F; 325/2; 340/147 SC

[56] References Cited

UNITED STATES PATENTS 3,603,736 9/1971 Morroll .......................... 179/15 BF

*Primary Examiner*—George H. Libman

*Attorney, Agent, or Firm*—Hane, Baxley & Spiecens

[57] ABSTRACT

In a telecommunication system having a central control unit and a telecommunication network wherein there are a plurality of stations interconnected by bidirectional primary links used during normal fault free operation and spare sections used when there is a fault in at least one of the primary links and wherein the central control unit initiates the changeover to selected spare sections upon detection of a fault, there is switchover apparatus in at least one of the stations and controlled by the central control unit for switching connections from primary links to space sections utilized by sub-routes.

15 Claims, 7 Drawing Figures

EMERGENCY SWITCHING EQUIPMENT FOR BROADBAND TRANSMISSION

This invention pertains to switching equipment especially suited for stations in a telecommunication network intended for automatic, central directed emergency switching of broadband links on a previously selected group band which is a common for the whole network.

The framework of a modern nationwide telecommunication network consists of coaxial cables and radio link sections. The main part of all long-distance telecommunication connections travels on these coaxial cables and radio link sections via multiplex systems, for example, carrier frequency systems of PCM systems.

The largest number of telephone channels, which can be transmitted on a radio channel, is at present 1,800. Two coaxial pairs in a coaxial cable, having normally four to six pairs per cable, can be occupied by up to 10,800 channels for transmission in both directions. It is easy to realize that a fault in such a large unit as a coaxial cable or a radio link section causes many reactions in the telecommunication system of a country.

To reduce the disturbing effects, which a fault in, for example, a long-distance cable causes, the traffic between each pair of arbitrarily selected stations in the network is generally divided in at least two different routes. If a fault appears in one route there is always at least one alternative route. The surviving operational route has, of course, less traffic carrying capacity than both routes had before the fault occurred. Therefore during peak traffic hours certain overload phenomena appear which expand the reactions of the fault more than otherwise into the operation of the network.

Up to now these problems have been handled by manually switching the defective links to suitable spare links. This procedure is rather flexible and relatively simple as far as it concerns a few links which need to be switched.

In spite of careful planning by means of detailed registers etc. the manual switching procedure will be more and more difficult to survey with the increasing number of links. Trying to solve the above-mentioned problems by means of remote controlled switches is then highly likely.

The proposals for solving the above discussed problem published in the technical literature up to now show that experiences from the switching technique in telephone exchanges have been utilized. All known proposals are in principle based on switching equipments of the matrix type. These switches have, however, some rather great disadvantages. It is technically rather complicated to design switches of a more or less complete matrix type for the high frequencies a modern multiplex system, for example, a carrier frequency system demands. Such a switch, furthermore, is very expensive and bulky. In conventional telephone exchanges, in general, only frequencies up to 4 kHz appear. However, broadband links are switched within, for example, the frequency band 312–552 kHz when the 60 group is used as switching band, 812–2,044 kHz when the 300 group is used and 8,516–12,388 kHz when the 900 group is used. Furthermore the published solutions of the problem show that the possibilities, which the switching equipment of the matrix type offers, are used only in a limited extent. Normally each input of the switching equipment only need to be connectable to two outputs that is the ordinary output and the alternative spare output. Of course, a system can be built which offers several alternative spare switching routes for a defective route, but it is most improbable that all the outputs of the matrix switch except the ordinary ones need to be used as spare outputs. Switches of matrix type also are relatively difficult to adapt to the different demands for switching capacity, which exists in different stations in the network. If only a few links need to be switched in a station, the capacity of the switching equipment is used unsatisfactorily while in stations where more links are switched than can be connected to one single matrix switch, connection in parallel and maybe connection in series of a necessary number of switches is needed. This is not only an expensive solution but it is also technically unfavourable.

Methods, in which completely developed matrix switches have been avoided, are also mentioned in the literature, for example, in Review of the Electrical Communication Laboratory, volume 17, No. 10, October 1969: A Study of an Automatic Supergroup Switching System (KAKIZAKI, TOMINAGA).

In the solution given in the above-mentioned work, in consideration of the fact that there is no need of connecting all inputs to all outputs in the matrix, one must only supply certain cross points therein with transmission switches of the plug-in type. The cross point itself consists, seen from the outside, of a socket corresponding to said plug-in-switch. However, to achieve full selectivity with the furnishing of the matrix for different connection needs in different stations, the whole switching bay with the different cross points must be within reach ready. This means that irrespective of the switching demand in a station, the station must be provided with the same space requiring switching bay for the total matrix, and where appropriate, with the switching bays for parallel and series connected matrixes.

An object of the present invention is to provide a switching equipment for automatic, central directed emergency switching in a long-distance communication network, which in regard to low costs, simple construction, flexible adaption to the switching demands of the different stations and little space requirement, is superior to the equipments with matrix switches used up to now. The use of a switching equipment according to the invention demands that the network of normal and spare links must be organized in a certain way, which will appear from the following. Besides the demands of the link network dependent on the design of the switching equipment certain restrictions are added. These restrictions arise from a suitability point of view or depend on the desire to reduce the costs for the link network. Below is a list of the terms adopted within the carrier frequency technique and defined by CCITT in White Book 1 Vol. III, Rec G 211, which terms will be used in the following description. These terms are:

Link: The whole of the means of transmission using a frequency band of specified width connecting two group distribution frames (or their equivalent). It extends from the point where the group is formed to the point where it is broken down. This expression is usually applied to the combination of "go" and "return" channels.

Section: Part of a group link between two adjacent group distribution frames (or their equivalent). A group link is generally made up of several "group sections," connected in tandem by means of "through-group filters."

Station: Place where links are terminated and/or through connected.

Route: The route the transmission links follow between two arbitrary stations in a long-distance network. A route can consist of one or more sub-routes.

Sub-route: Route between two adjacent stations.

The switching equipment according to the invention is defined in the appended claims.

The switching equipment according to the invention will be described below by means of an embodiment in connection to the accompanying drawings where FIG. 1 shows a network containing nine stations with the associated sub-routes where each sub-route indicates a possible path for one or more links.

Figures 1, 2, 3, 4, 5:
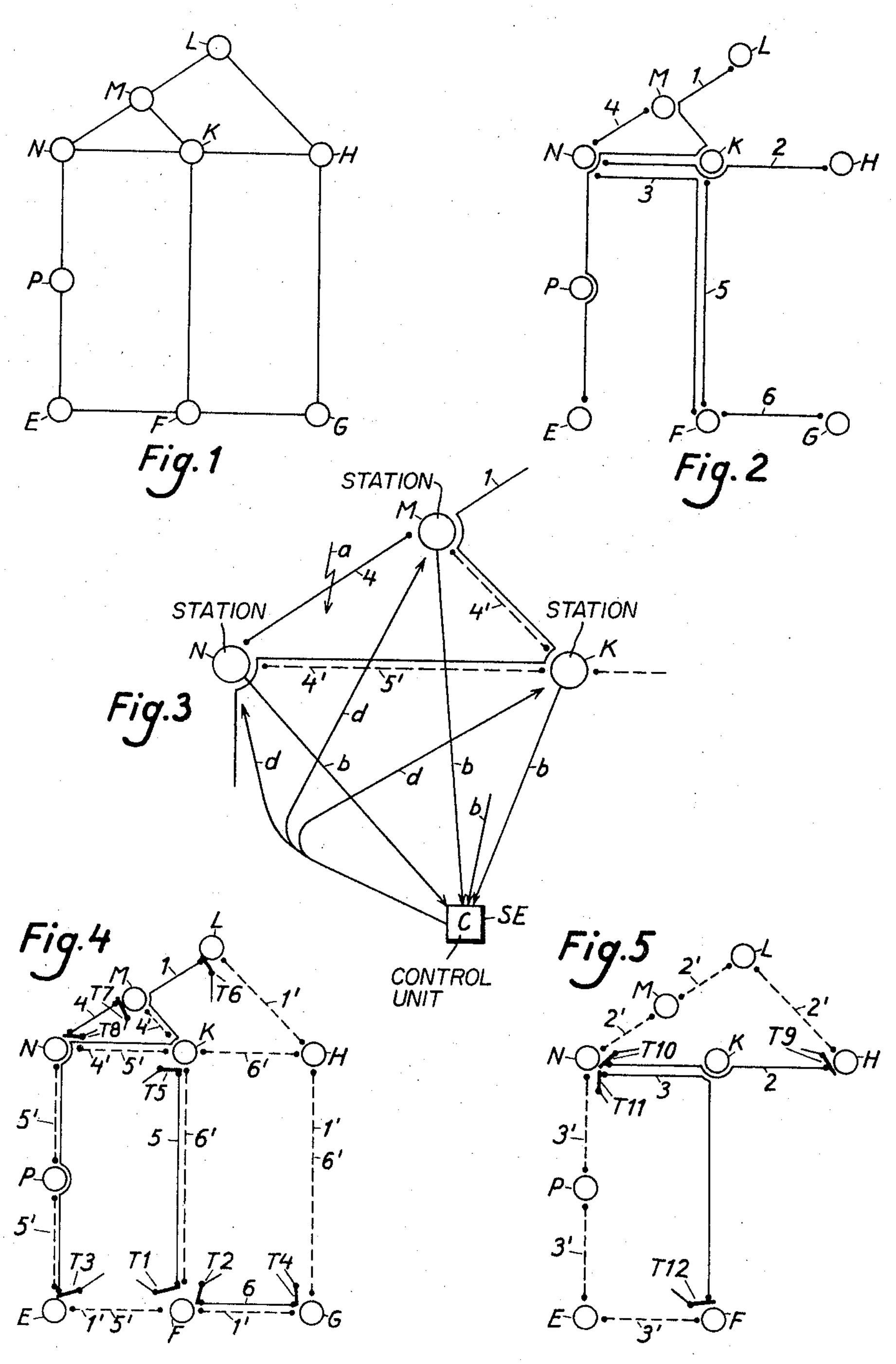
FIG. 2 shows the network according to FIG. 1 with six normal links inserted.
FIG. 3 shows a simple example of a superior control system and the flow of information that will occur between this control system and the stations of the network, when a break-down occurs in a normal link.
FIG. 4 shows the network according to FIG. 1 with some of the normal links according to FIG. 2, selected according to certain specific rules, and the necessary and sufficient spare sections which are needed to emergency switch these normal links when an arbitrary single fault occurs in the network.
FIG. 5 shows the two remaining normal links together with the spare sections.

In FIG. 1 an example of a network is shown, which contains nine stations E, F, G, H, K, L, M, N, P, and the cable sub-routes between these stations. The normal and spare links, which are included in the networks, will thus have to follow the transmission routes, which are indicated by the direction of the sub-routes. From FIG. 2 the direction of six normal links 1–6 in the network appears where every normal link consists of one section or several cascaded sections. The links 4, 5 and 6 consist of only one section while the others comprise at least two sections. In FIG. 2 the connection of two cascaded sections has been illustrated by a curve around the respective station but the electrical interconnection or the through connection takes, of course, place in the station, however, without the aid of transmission switches. The set of transmission equipment, which is shown schematically in FIGS. 1 and 2, thus constitutes the long-distance communication network which is to be emergency switched when a fault in one or more links occurs. A fault in a link means in this context an interruption in one or both transmission directions. In the following it is assumed that only one fault at a time appears in the network. If the fault, however, appears on a sub-route, which comprises several normal and spare links, interruption is assumed to occur on all of these links. With emergency switching is meant that a faulty link is replaced by an alternative transmission route between the terminal stations of said link.

The network above can, of course, be emergency switched manually as well as automatically. In the latter case this may take place, for example, by means of a superior control system according to FIG. 3. Faults of the above-mentioned type with interruptions in one or more links in the same place is discussed, because of the fact that this type of faults constitutes according to information from certain telecommunication administrations a very great part of the total number of faults on the links in a long-distance network. These faults appear often, when for example excavators happen to tear up a transmission cable. In FIG. 3, which shows a part of the network according to FIG. 1 and 2, a presumed interruption, phase a, in a normal link 4 between the stations N and M is illustrated. For interruption detection purposes it is presumed that the group transmitted on the link 4 is provided with at least one pilot signal for each direction, which pilot signal can be separated and detected in the terminal stations. A loss of the pilot signal at the receiver end of the transmission for a time exceeding a given minimum time, when simultaneously stating that the pilot signal is applied to the transmission at the transmitter end, is interpreted as an interruption in the link. It is not necessary that such pilot signal be used exclusively for interruption indication it can in a conventional way furthermore be used for the purpose of signal level control, etc. The control unit SE in FIG. 3 scans continuously or in a repeated sequence the state of the terminated links in all the stations of the network. In the illustrated example when there is an interruption on link 4 information arrives at the control system, phase *b*, when loss of pilot signal is detected in the stations N and M and at the same time that the transmission of a pilot signal in each direction is detected. The other stations give simultaneously or in the same test cycle no fault indication. The control unit SE processes incoming data, phase *c*, and establishes the location of the fault in the network. It then transmits switching orders, phase *d*, to relevant stations to initiate the steps necessary for the emergency switching.

In the FIGS. 4 and 5 there is shown how the normal links according to FIG. 2 have been distributed on two sub-networks according to specific given principles, the configuration of which on the whole coincides with the one of the network according to FIG. 1. It is to be understood that a sub-network or switching plane is a part of the whole network, the configuration of which in main coincides with the one of the whole net. The different sub-networks concern the connections quite separated from each other and the total network consists of the sum of the different sub-networks. In the sub-network according to FIG. 4 the normal links 1, 4, 5 and 6 are indicated by continuous lines and the spare sections, indicated by dashed lines are inserted. These links and sections are necessary and sufficient, in consideration of the above-stated principles, for emergency switching of the normal links 1, 4, 5 and 6 if a single fault in the sub-network occurs. The spare sections being used in emergency switching of the normal link 1 has the symbol 1′, and so on. The remaining normal links and their spare sections have in an analogous way been inserted in the sub-network according to FIG. 5. These two sub-networks are to be assumed to be in a plane of their own and superimposed on each other and the total network consists per sub-route of the sum of the normal and spare links which are included in corresponding sub-routes in the different sub-networks. The same thing is valid for the switches in the different sub-networks, that is the total number of switches T1, T2 . . . and the switches arranged to achieve connection between the spare sections in every station, which switches are not shown, and their switching functions are given by the superimposed image of all sub-networks.

The principles according to which the normal links have been distributed on the different sub-networks causes the following criterions to be fulfilled for every individual sub-network:

a. every normal link traverses the switching equipment only in the two terminal stations. In all other stations, which the link passes, the through connection of the link takes place in a conventional way, that is, by means of direct through-connection filters.
b. every normal link has a beforehand determined spare link which is during the emergency switching event built up by spare sections all belonging to other sub-routes than the normal link in question.
c. in every sub-route maximally one spare section is included, which spare section can be used, according to the example, for emergency switching of several different normal links. However, for every station it is valid that every spare section connected to this one can be used for emergency switching of maximally two groups terminated in the station.
d. in every station every spare section can be connected to the other spare sections one at a time, via direct through connection filters.

To demonstrate how starting from a given network structure and a certain number of given normal links the distribution of these latter ones is carried out on the different sub-networks, the example illustrated in the FIGS. 1, 2, 4 and 5 will be described more in detail.

The distribution of the different normal links to the different sub-networks in consideration of the above-mentioned criterions *a–d* can be carried out as follows.

The normal link 1 can be inserted in the sub-network according to FIG. 4 with a planned spare link route according to the same Fig. and with all the criteria *a–d* being fulfilled. One can notice that no matter where on the normal link 1 a single fault appears, the spare sections 1' are not affected. These spare sections are intended to be used in emergency switching of normal link 1. If one now tries to insert normal link 2 in the same subnetwork, one will find that no matter how the route of the spare link is arranged (the two possible routes are from station N via the stations M and L to station H and from station N via the stations P, E, F, G to station H) the two normal links 1 and 2 will have to be emergency switched simultaneously when a fault occurs between the stations N and K. Because of the fact that the spare link of the normal link 1 and each of the two possible spare links for the normal link 2 have at least one sub-route in common, the criterion *c* cannot be fulfilled while the emergency switching requires two spare sections on one sub-route. Thus the normal link 2 cannot be inserted in the same sub-network as the normal link 1. The normal link 2 is instead inserted in the sub-network according to FIG. 5. Because no normal links had been previously inserted in this sub-network this is quite possible. If the above-mentioned arguments are applied to the normal link 3 one will find that it cannot be inserted in the sub-network according to FIG. 4 for the same reason as was valid for the normal link 2. If one then instead examines if it is possible to insert the normal link 3 in the sub-network according to FIG. 5 one will find that this is possible in spite of the fact that the normal links 2 and 3 have a common sub-route between the stations N and K and thus must be emergency switched at the same time if a fault occurs between these stations. It is also possible to insert the normal links 4, 5 and 6 in the sub-network according to FIG. 4, which is also possible with several other normal links, which have, however, not been shown in our example.

By repeating the above-mentioned argumentation for every normal link included in the network, each normal link can be inserted in a specific sub-network.

Figure 6:
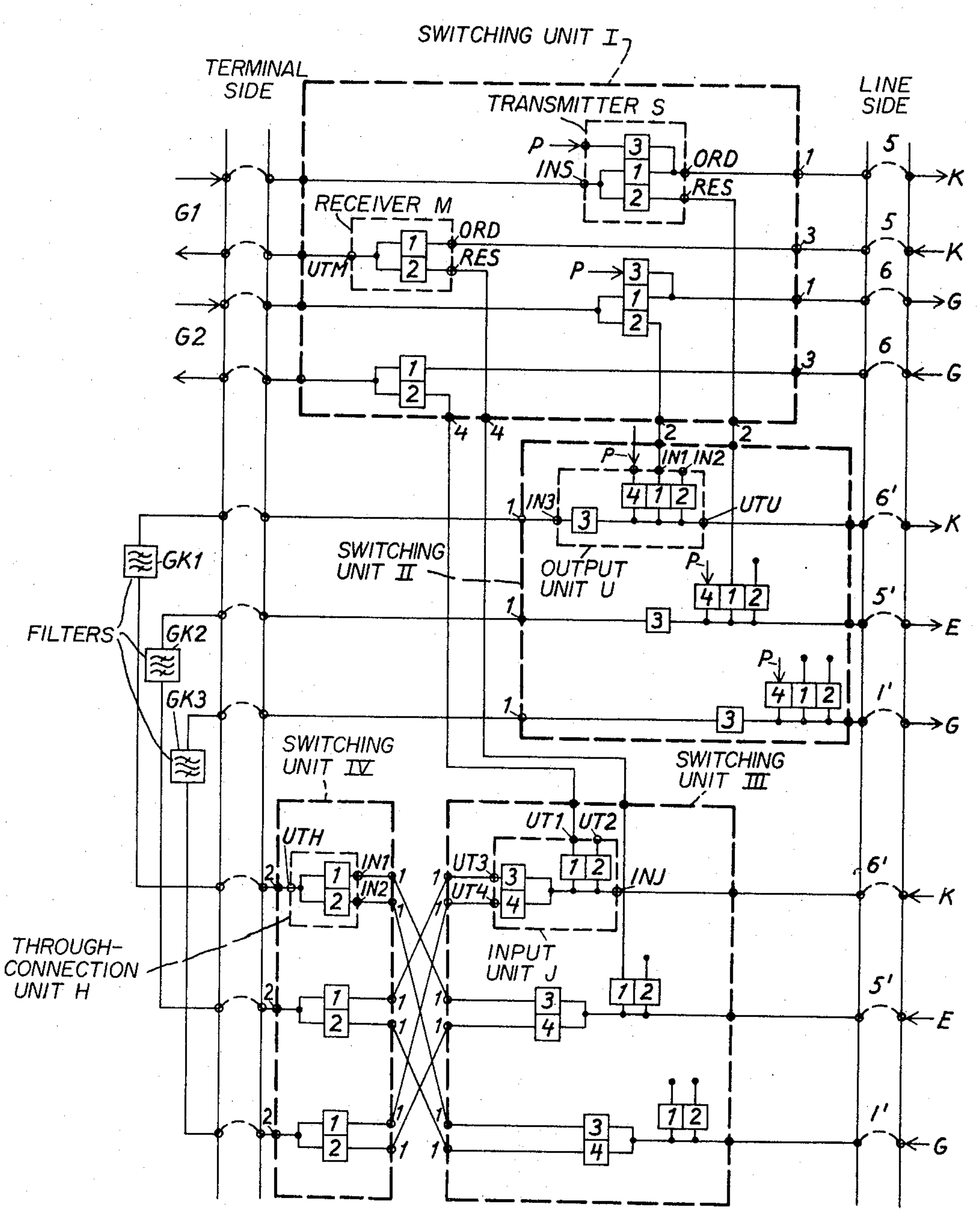
FIG. 6 shows in detail an example how the switching equipment in station F according to FIG. 4 can be arranged.

In FIG. 6 there is shown how in station F the switching equipment associated with the sub-network according to FIG. 4 can be arranged in a distributor rack. In station F, of course, there is also arranged the switching equipment associated with the sub-network according to FIG. 5, possibly in the same distributor rack, but this is not discussed in the shown example.

The switching equipment in the rack can be arranged in four units well delimited in a functional way, the switching arrangements I–IV being shown within dashed lines. Each of these switching arrangements can then be divided into subunits. Five different types of subunits have been indicated. These constitute the modules in all switching equipments in the network in the shown or somewhat modified form. The transmitter unit S appears in the different stations in the network only in the shown embodiment and appears in all stations where links are terminated regardless of the number of connection directions to the station. Likewise the receiver unit M only appears in the shown embodiment. In addition, the same conditions are valid as for the transmitter unit S. Also the output unit U for spare links appears only in the shown embodiment, while on the other hand the input unit J for spare links has three embodiments for use in different stations dependent on the number of directions for outgoing sub-routes from the station in question. The different versions differ regarding the number of outputs connected to the following through connection units H. The through connection unit H has two embodiments, which coincide with two of the embodiments for the input unit J. Thus by this grouping of the switches in functional units considering all embodiments of these, totally six different units are available for designing the switching equipment of the whole network.

In station F according to FIG. 6 two terminated groups G1 and G2 are connected to the left side of the distributor rack, here called the terminal side. A transmitter unit S, consisting in principle of three switches 1, 2 and 3, connects each group to the right side of the distributor rack, here called the line side, from which the transmission starts in the direction of the stations K and G. The switch 1 of transmitter S can connect the input INS of the transmitter to the ordinary output ORD, the switch 2 can connect the INS to the spare output RES and the switch 3 can connect a spare pilot P to the ordinary output ORD. The switches 1, 2, 3 and all other switches are of the open and close type and in this example presumed to have the forward direction attenuation 0 dB. Some of the subunits or modules have built-in safety logic, that is, a decentralized switching logic, which can, for example, prevent certain switching sequences, even if these should be directed from the central control unit. Thus, for example, the transmitter unit S has built-in logic, which, when the traffic is connected via the ordinary output of the transmitter unit S, controls the switch 3 to off-position for reasons described below. The opposite part of each connection is connected to the terminated group on the terminal side of the rack from the line side of the rack via a receiver unit M comprising two switches. The switch 1 of the receiver unit can connect the ordinary input ORD to the output UTM and the switch 2 can connect the spare input RES to the output UTM. The safety logic or interlock of the receiver unit functions to prevent the switches 1 and 2 from being in conduction state simultaneously.

The dashed curves on the two sides of the rack indicate the attached straps in the rack. On the line side these straps are provided with digit symbols which correspond to the symbols for the normal and spare links in FIG. 4. The equipment now described with a transmitter unit and a receiver unit for every terminated group constitutes the rack equipment for connection of the groups to their respective normal links. This equipment has been combined to one unit, the switching unit I. According to the above-mentioned criteria (criterion *b*), which is to be valid for every single sub-network, every terminated group is to be connectable alternatively to its normal link and its spare link. According to FIG. 4 the spare link for transmission of the traffic group G1 is leading from station F in the direction of station E. In FIG. 6 an output unit U for spare links is shown for making a connection possible of the group G1 via the spare output Rs of the transmitter S and the input IN 1 of the output unit to spare section 5' on the sub-route in the direction of station E. Furthermore according to criterion c every spare section, which is connected to the station, shall be able to be used for emergency switching of maximally two groups terminated in the station. Accordingly, output unit U is therefore provided with an additional input IN 2 for connection of a terminated group, which input is, however, not used in this special case. The switches 1 to 4 of the output unit U can each connect an input to the common output UTU. Also this unit has built-in safety logic (not shown) which in this case provides that only one of the switches at a time is in the conduction state. For each of the remaining two spare sections connected to the station in the direction of stations K and G the distributor rack is provided with an equivalent output unit U for spare links. All the output units have been combined to a unit, switching unit II.

The opposite part of the connection on each spare section is connected to an input unit J for spare links, which input unit consists of four switches numbered 1 inclusive to 4. These switches can connect the input INJ of the input unit to their respective outputs. This unit has no safety logic. The switches 1 and 2 are intended for connection of the spare section connected to the input INJ via spare inputs RES of suitable receiver units to a terminated group on the terminal side of the distributor rack, in such a way that the two traffic directions on the same spare section is connected to the same terminated group. The incoming traffic on the spare section from E can thus be connected to the group G1 on the terminal side of the rack. For the same reason as the output units U have a second input IN2, the input units J have a second output UT2, which is, however, not used on any of the units in this example. The remaining input units J for spare links are connected in a similar way where appropriate to terminated groups on the terminal side of the rack via the spare input RES of the associated receiver unit M. All input units J have been combined to one unit, switching arrangement unit III.

According to criterion *d* in each station each spare section connected to the station and associated with a specific sub-network is to be connectable to the other spare sections connected to such station in the same sub-network. In the present example there are three directions for the different sub-routes from the station F and the spare section associated with one of the sub-routes is thus to be connectable to the spare sections on the two other sub-routes. For this purpose in every input unit two switches 3 and 4 are arranged. These switches can connect the one traffic direction of a given spare section via a through connection unit H and an associated direct through connection filter GK to an output unit U associated with the spare section of one of the other sub-routes.

The through connection unit H comprises two switches 1 and 2, each of which can connect an associated input IN1, IN2 to the common output UTH. Built-in safety logic is not included in this apparatus. All through connection units H have been combined to a unit, the switching unit IV. The three direct through connection filters GK1 to GK3 permanently connected to the terminal side of the rack are of a conventional type.

When a normal link or a spare section is not occupied by traffic, a pilot signal P is transmitted on thereon for function control of the link or the section. This pilot signal has the same frequency (CCITT-standardized), as the pilot signal, which belongs to and is included in the group, with which the link or the section can be occupied. The transmitter unit S and output unit U, which have arrangements for insertion of a pilot signal on a connected link or section, have as mentioned above also a built-in safety logic which in a compulsory way controls the disconnection of the pilot signal, in the case of the transmitter unit 5 when the traffic is connected via the ordinary output ORD and in the case of the output unit U when one of the switches 1, 2 or 3 is closed. The receiving of the pilot signals in the traffic coming in to the line side of the rack takes place outside the distributor rack and is not shown.

Figure 7:
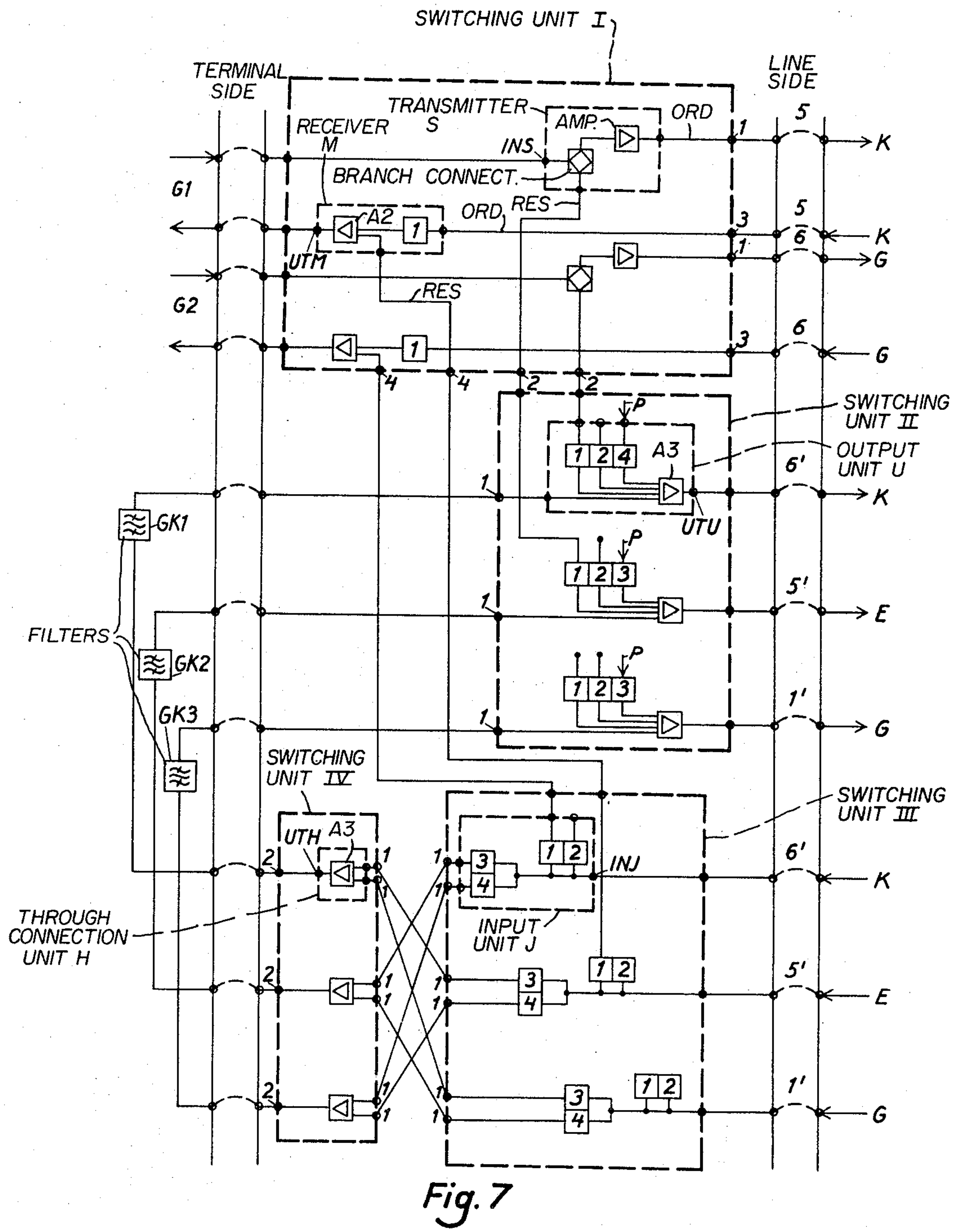
FIG. 7 shows an alternative embodiment of the switching equipment according to FIG. 6.

In FIG. 7 there is an alternate embodiment of the switching equipment in station F. Since the equipment is in many respects the same as in FIG. 6 and since it operates in the same manner, only the difference will be discussed in detail. In the transmitter S, the pilot signal source P and switch 3 have been deleted. Switches 1 and 2 have been replaced by branch connector having an input connected to input INS and a first output connected to line RES and a second output. Note the redundant control function performed by switch 2 of the transmitter S of FIG. 6 is now performed only by switch 1 of output unit U connected via a broadband amplifier to line ORD. The switches 1 and 2 of the receiver M of FIG. 6 have been replaced by switch 1 and a broadband amplifier A2. Now line OR is connected via switch S1 and the broadband amplifier to junction JIM and lines RES is connected via the second input of the amplifier to junction JIM. Note the redundant control function performed by switch 2 of receiver M of FIG. 6 is now performed only by switch 1 of input unit J. In output unit U, the outputs of switches 1, 2 and 4 have been fed via broadband amplifier A3 to terminal UTU. Switch 3 has been deleted and its redundant function performed only by switches 3 of input units J. Switches 1 and 2 of through connector unit H have been replaced by two-input broadband amplifier A3 with the redundant switching functions now being performed by switches 3 of the input units J. These changes permit the use of switches having attenuations and varying impedances. It also decreases the number of switches.

By constructing the switching equipment by means of a few different modules, to which in the way described functionally associated parts of the equipment have been connected, it has been possible in a space-saving way to adapt the switching equipment in the specific station to the switching requirement in question of that station at the same time as extension or other modification of the switching equipment can be done flexibly and step by step if so desired. Thus, a considerable saving of costs is obtained because no station needs to be provided with unnecessary overcapacity concerning switching functions, which should result in unnecessarily low degree of utilization for the equipment.

As it appears from the description the different modules or sub-units have a very simple design, which together with the small total number of variations leads to production economies, small inventories and simple servicing.

Because of the fact that certain modules have built-in decentralized switching logic the total switching equipment of the network can be extended considerably without the demands for capacity on the central control unit being increased appreciably.

We claim:

1. In a telecommunication system having a central control unit and a telecommunication network wherein there are a plurality of stations interconnected by bidirectional primary links used during normal fault-free operation and spare sections used when there is a fault in at least one of the primary links and wherein the central control unit initiates the changeover to selected spare sections upon detection of a fault, switchover apparatus controlled by the central unit in at least one of the stations wherein at least one of the primary links terminates and the station has the terminal equipment associated with such primary link and at least two spare sections connected from said one station to other stations, said switchover apparatus comprising: a first switching unit having first and second internal terminals (UT1, IN1), incoming signals switching means (M) for connecting either the primary link (5) to the terminal equipment of said first internal terminal to the terminal equipment, and outgoing signals switching means (S) for connecting the primary link to the terminal equipment or to said second internal terminal; a second switching unit having a third internal terminal (IN3) and an output switching means (U) for connecting either said second internal terminal or said third internal terminal to the spare section (5'); a third switching unit having a fourth internal terminal (UT3) and an input switching means (J) for connecting the spare section (5') to either said third internal terminal or said first internal terminal; and a fourth switching unit having a through connection means (H) for connecting either said fourth internal terminal (UT3) or the other spare section (1') to said internal terminal.

2. In a telecommunication system including a plurality of stations which have terminal equipment for sending and receiving information and are interconnected by primary links in which traffic flows in first and second directions and spare sections and wherein a central control unit controls the switching to spare sections which are parts of sub-routes when a fault occurs in the portion of a primary link between two stations, switching equipment in at least one of the stations comprising: a first switching unit having a plurality of first terminals, a plurality of second terminals, a plurality of third terminals, a plurality of fourth terminals, and first switch means for connecting the terminal equipment used in one direction of traffic flow, either via said first terminals, to the associated primary links terminating at the station or to said second terminals and for connecting the terminal equipment used in the other direction of traffic flow either via said third terminals to the associated primary links terminating at the station or to said fourth terminals; a second switching unit having a plurality of first terminals and second switch means for connecting in the one direction of traffic flow each spare section connected to the station either to one of a plurality of the second terminals of said first switching unit or to one of its first terminals; a third switching unit having a plurality of first terminals and a third switch means for connecting in the other direction of traffic flow each spare section connected to the station either to one of a plurality of the fourth terminals of said first switching unit or to one of its first terminals; and a fourth switching unit having a plurality of first terminals respectively connected to one of said first terminals of said third switching unit, a plurality of second terminals respectively connected to one of said first terminals or said second switching unit and fourth switch means for connecting in the other direction of traffic flow the first terminals to the second terminals in such a way that all but one of the spare sections of the sub-routes connected to the station is connected to said one spare section via said third switching unit, said fourth switching unit and said second switching unit; the central control unit controlling the operation of the switching means of said switching units.

3. Switching equipment according to claim 2 wherein in said first switching unit the first switch means comprises for every primary link, terminating in the station, a transmitter unit and a receiver unit, said transmitter units and said receiver units, respectively, being mutually identical.

4. Switching equipment according to claim 2 wherein in said second switching unit the second switch means comprises for every spare section connected to the station an output unit, all such output units being identical.

5. Switching equipment according to claim 2 wherein in said third switching unit the third switch means comprises for every spare section connected to the station, an input unit, all such input units being identical.

6. Switching equipment according to claim 2 wherein in said fourth switching unit the fourth switch means comprises for every spare section connected to the station a through connection unit, all such through connection units being identical.

7. Switching equipment according to claim 3 wherein each of said transmitter units has an input terminal connected to the terminal equipment utilized in the one traffic direction and further comprises means for connecting said input terminal alternatively to one of the first and one of the second terminals to said first switching unit.

8. Switching equipment according to claim 3 wherein each of said receiver units has an output terminal connected to the terminal equipment utilized in the other traffic direction and further comprises means for connecting said output terminal alternatively to one of the third and one of the fourth terminals of said first switching unit.

9. Switching equipment according to claim 4 wherein each of said output units has an output terminal connected to a spare section and further comprises means for alternatively connecting said output terminal to one of the first terminals of said second switching unit and to one of a plurality of the second terminals of said first switching unit.

10. Switching equipment according to claim 5 wherein each of said input units has an input terminal in the other traffic direction for one of the said spare sections connected to the station and means for alternatively connecting said input terminal to one of a plurality of the fourth terminals of said first switching unit and to a number of the first terminals of said third switching unit one at a time, said number being equal to the number of sub-routes connected to the station less one.

11. Switching equipment according to claim 6 wherein each of said through connection units has an output terminal connected to one of the second terminals of said fourth switching unit and means for alternatively connecting said output terminal to a number of the first terminals of said fourth switching unit, which number is equal to the number of sub-routes connected to the station less one.

12. Switching equipment according to claim 3 wherein each of said transmitter units comprises an input terminal connected to the terminal equipment utilized in the one traffic direction, a transmission bridge, an amplifier, and means for connecting said input terminal via said transmission bridge to one of the second terminals and via said transmission bridge and amplifier to one of the first terminals of said first switching unit.

13. Switching equipment according to claim 3 wherein each of said receiver units comprises an output terminal connected to the terminal equipment utilized in the second traffic direction and a two-input amplifier and a switch connected between one input of said amplifier and a third terminal of said first switching unit, the second input of said amplifier being connected to a fourth terminal of said first switch unit, and said output terminal being connected to the output terminal of said amplifier.

14. Switching equipment according to claim 4 wherein each of said output units comprises an output, a multi-input amplifier having an output terminal connected to said output and a switch connected to each of the inputs of said amplifier less one, said switches connecting the inputs of said amplifier to a plurality of the second terminals of said first switching unit and, respectively, the input without a switch being connected to one of the first terminals of said second switching unit.

15. Switching equipment according to claim 6 wherein each of said through connection units comprises an output terminal connected to one of the second terminals of said fourth switching unit, an amplifier having a plurality of inputs connected to a number of the first terminals of said fourth switching unit, which number is equal to the number of sub-routes connected to the station less one, and means for connecting the output of said amplifier to said output terminal.

* * * * *